United States Patent
Nam et al.

(10) Patent No.: US 8,824,788 B2
(45) Date of Patent: Sep. 2, 2014

(54) DEVICE AND METHOD OF COMPRESSING IMAGE FOR DISPLAY DEVICE

(75) Inventors: Seung-Seok Nam, Yongin-si (KR); Youn-Jin Jung, Daejeon (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 431 days.

(21) Appl. No.: 13/219,150

(22) Filed: Aug. 26, 2011

(65) Prior Publication Data

US 2012/0257823 A1 Oct. 11, 2012

(30) Foreign Application Priority Data

Apr. 6, 2011 (KR) .......................... 10-2011-0031753

(51) Int. Cl.
*G06K 9/36* (2006.01)

(52) U.S. Cl.
USPC .......................................................... 382/166

(58) Field of Classification Search
USPC .................................. 382/166, 238, 239, 246
See application file for complete search history.

(56) References Cited

U.S. PATENT DOCUMENTS

| 7,266,247 B2 | 9/2007 | Kim et al. |
| 7,382,294 B2 | 6/2008 | Yokose et al. |
| 7,751,633 B1 * | 7/2010 | Mukherjee ................. 382/239 |
| 7,801,363 B2 | 9/2010 | Hong et al. |
| 2005/0195901 A1 * | 9/2005 | Pohjola et al. .......... 375/240.24 |
| 2007/0031049 A1 | 2/2007 | Kim |
| 2009/0067733 A1 | 3/2009 | Ballerini |
| 2010/0027617 A1 | 2/2010 | Lee et al. |
| 2011/0164678 A1 * | 7/2011 | Date et al. ............... 375/240.03 |

FOREIGN PATENT DOCUMENTS

| JP | 11-275578 | 10/1999 |
| JP | 3732674 | 10/2005 |
| JP | 2007-019878 | 1/2007 |
| JP | 2010-200018 | 9/2010 |
| KR | 10-0498513 | 6/2005 |
| KR | 1020080018768 | 2/2008 |
| KR | 10-2010-0012738 | 2/2010 |
| KR | 1020110127456 | 11/2011 |

* cited by examiner

*Primary Examiner* — Phuoc Tran
(74) *Attorney, Agent, or Firm* — F. Chau & Associates, LLC

(57) ABSTRACT

A mode coding unit for an image compression device includes a submode determination unit, a variable bit determination unit, and a coding unit. The submode determination unit is configured to determine a submode of an image block. The submode indicates a matching degree between an upper bit of the image block and an upper bit of a reference block. The variable bit determination unit is configured to determine a size of primary color compression information fields corresponding to primary colors in a reference pixel in the image block based on a relational size of color information of the primary colors. The coding unit is configured to generate compressed image data by coding the image block based on the submode and the size of the primary color compression information fields.

21 Claims, 22 Drawing Sheets

FIG.10

| | R | |
|---|---|---|
| A→ | rA(7)rA(6)rA(5)XXXXX | rB(7)rB(6)rB(5)XXXXX | ←B |
| 303→ | rA(7)rA(6)rA(5)r1(4)r1(3)r1(2)r1(1)X | rB(7)rB(6)rB(5)r2(4)r2(3)r2(2)r2(1)X | ←305 |
| 304→ | rA(7)rA(6)rA(5)r3(4)r3(3)r3(2)r3(1)X | rB(7)rB(6)rB(5)r4(4)r4(3)r4(2)r4(1)X | ←306 |

Sub mode 0

DEVICE AND METHOD OF COMPRESSING IMAGE FOR DISPLAY DEVICE

CROSS-REFERENCE TO RELATED APPLICATION

This application claims priority under 35 U.S.C. §119 to Korean Patent Application No. 10-2011-0031753 filed on Apr. 6, 2011, the disclosure of which is incorporated by reference herein in its entirety.

BACKGROUND

1. Technical Field

The present invention relates to a device and method of compressing an image for a display device.

2. Discussion of the Related Art

An image frame for a display device includes a plurality of pixels in the shape of an array matrix. The image information in the image frame may be compressed using an image compression device to reduce the size of the image information. Although compression may reduce the size of the image information, some of the image information may be lost due to the compression. When a large amount of image information is lost, the number of errors may be increased when the image information is recovered, resulting in decreased image quality.

SUMMARY

Exemplary embodiments of the present invention include a device and method of compressing an image for a display device capable of reducing errors.

An exemplary embodiment of the present invention provides a mode coding unit for an image compression device. The mode coding unit includes a submode determination unit, a variable bit determination unit, and a coding unit. The submode determination unit is configured to determine a submode of an image block. The submode indicates a matching degree between an upper bit of the image block and an upper bit of a reference block. The variable bit determination unit is configured to determine a size of primary color compression information fields corresponding to primary colors in a reference pixel in the image block based on a relational size of color information of the primary colors. The coding unit is configured to generate compressed image data by coding the image block based on the submode and the size of the primary color compression information fields.

An exemplary embodiment of the present invention provides a method of compressing image data. The method includes determining a submode of an image block, determining a size of primary color compression information fields corresponding to primary colors in a reference pixel in the image block based on a relational size of color information of the primary colors, and generating compressed image data by coding the image block based on the submode and the size of the primary color compression information fields. The submode indicates a matching degree between an upper bit of the image block and an upper bit of a reference block.

An exemplary embodiment of the present invention provides an image compression device. The image compression device includes a mode coding unit, a mode determination unit, and an entropy coding unit. The mode coding unit is configured to generate compressed image data corresponding to each of a plurality of compression modes. The mode determination unit is configured to select one of the plurality of compression modes based on a number of errors in the compressed image data corresponding to each of the plurality of compression modes. The entropy coding unit is configured to output final compressed image data based on the compression mode selected by the mode determination unit.

BRIEF DESCRIPTION OF THE DRAWINGS

FIGS. 9 to 20 are diagrams showing examples of the relationship between a variable bit allocation indicator and the size of three primary color compression information fields, according to exemplary embodiments of the present invention.

DETAILED DESCRIPTION

Figure 1:
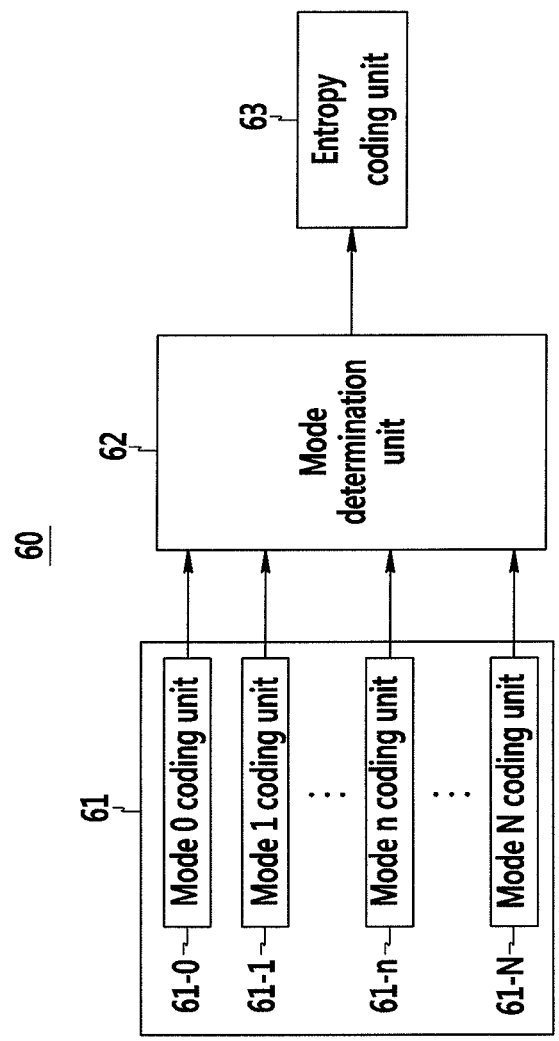
FIG. 1 is a block diagram showing the structure of an image compression device for a display device, according to an exemplary embodiment of the present invention.

Exemplary embodiments of the present invention will be described more fully hereinafter with reference to the accompanying drawings. Like reference numerals may refer to like elements throughout the accompanying drawings.

As will be appreciated by one skilled in the art, aspects of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

FIG. 1 is a block diagram showing the structure of an image compression device 60 for a display device according to an exemplary embodiment of the present invention.

Referring to FIG. 1, an image compression device 60 includes a mode coding unit 61, a mode determination unit 62, and an entropy coding unit 63.

The image compression device 60 generates compressed image data by compressing image information included in an image frame. The image compression device 60 may be included, for example, in a display device.

The display device may be, for example, a liquid crystal display (LCD), and the image compression device 60 may compress the image information for dynamic capacitance compensation (DCC).

An image frame includes a plurality of pixels in the shape of an array matrix. A single image frame displays a still picture, and a plurality of image frames displays a video. Each pixel in an image frame includes color information corresponding to different colors. For example, although exemplary embodiments of the present invention described hereinafter include three primary colors red (R), green (G), and blue
(B), the colors in each pixel are not limited thereto.

When the color information corresponding to a single color is represented as 8 bits, the color information of the single color indicates a single gray scale value from among 256 gray scale values (e.g., 0 to 255). Since each pixel includes color information of the three primary colors, the color information of each pixel is 24 bits (e.g., 3*8 bits).

The image frame may be divided into a plurality of image blocks that do not overlap with each other. For example, the image block may include 4 pixels disposed in two rows and two columns. In this configuration, the size of the image block is 2*2. In an exemplary embodiment including the colors red (R), green (G) and blue (B), the image block includes a red image block, a green image block, and a blue image block.

When the image information of the image frame is compressed on a block-by-block basis, a plurality of compression modes may be used for the different blocks. The mode coding unit 61 includes a plurality of coding units 61-0, 61-1, . . . , 61-N. Each coding unit corresponds to one of the plurality of compression modes. For example, each of the plurality of coding units 61-0, 61-1, . . . , 61-N compresses the image information according to its respective compression mode to generate the compressed image data for each mode. In an exemplary embodiment, one of the plurality of compression modes is a pulse code modulation (PCM) mode.

The mode determination unit 62 receives the compressed image data for each mode from the plurality of coding units 61-0, 61-1, . . . , 61-N and selects one of the compression modes. The mode determination unit 62 determines errors for the compressed image data for each mode, and selects the compression mode that results in the fewest errors. For example, in an exemplary embodiment, the mode determination unit 62 decodes the compressed image data for each mode to generate recovery information, compares the recovery information with the image information to generate the error information, and uses the error information to select the compression mode resulting in the fewest errors. In this case, the error information is the difference between the recovery information and the image information.

The entropy coding unit 63 generates compressed image data by compressing the image information based on the compression mode selected by the mode determination unit 62. For example, if the mode determination unit 62 determines that the PCM mode among the plurality of compression modes results in the fewest errors, the entropy coding unit 63 generates the compressed image data based on the PCM mode.

Figure 2:
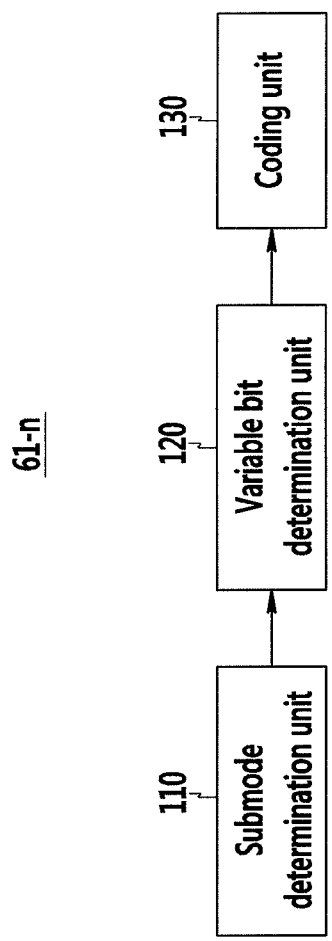
FIG. 2 is a block diagram showing the structure of a pulse code modulation (PCM) mode coding unit of the image compression device, according to an exemplary embodiment of the present invention.

FIG. 2 is a block diagram showing the structure of a PCM mode coding unit 61-n of the image compression device 60 according to an exemplary embodiment of the present invention.

The PCM mode coding unit 61-n may be any of the plurality of coding units 61-0, 61-1, . . . , 61-N in the mode coding unit 61. For example, the PCM mode coding unit 61-n may be the mode n coding unit 61-n shown in FIG. 1, however the PCM mode coding unit 61-n is not limited thereto. The PCM mode coding unit 61-n performs PCM compression.

Referring to FIG. 2, the PCM mode coding unit 61-n includes a submode determination unit 110, a variable bit determination unit 120, and a coding unit 130.

The submode determination unit 110 determines a submode of an image block. The submode is determined according to a matching degree between an upper bit of the image block and an upper bit of a reference block. The reference block may be adjacent to the image block, however the location of the reference block is not limited thereto. When there are four types of submodes, the submode may be determined by comparing the upper 3 bits of the image block with the upper 3 bits of the reference block. In an exemplary embodiment, submode 0 is defined as a case in which the upper 3 bits are matched, submode 1 is defined as a case in which the upper 2 bits are matched, submode 2 is defined as a case in which the upper 1 bits are matched, and submode 3 is defined as a case in which the upper 3 bits are not matched. The submode is determined by comparing all of the image information of the three primary colors for each pixel included in the image block. The submode is determined based on the minimum upper bits that are matched between the image block and the reference block. For example, when the upper 3 bits of the red image block and the reference block are matched with each other, the upper 2 bits of the green image block and the reference block are matched with each other, and the upper 1 bits of the blue image block and the reference block are matched with each other, the submode is determined based on the matching upper 1 bits of the blue image block and the reference block. As a result, the submode is defined as submode 2.

Figure 3:
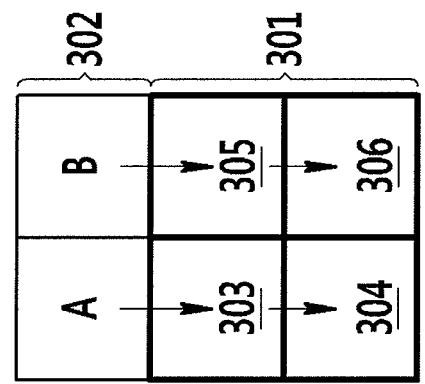
FIG. 3 is a diagram showing an example of an image block, a reference block, and a submode determination direction, according to an exemplary embodiment of the present invention.

FIG. 3 is a diagram showing an example of an image block 301, a reference block 302, and a submode determination direction according to an exemplary embodiment of the present invention. FIGS. 4 to 7 are diagrams showing different submodes of the image block 301 of FIG. 3 according to exemplary embodiments of the present invention.

Referring to FIG. 3, the image block 301 includes four pixels 303, 304, 305, 306, and the size of the image block 301 is 2*2. A and B are reference pixels of the reference block 302 and are adjacent to the image block 301 (e.g., A and B are pixels of a row above the image block 301). The arrows shown in FIG. 3 represent the submode determination direction. The submode determination direction is not limited to the direction shown in FIG. 3, and may be variably set. In an exemplary embodiment, there may be no adjacent pixels of the image block 301 since the image block 301 is located at a boundary of the frame. In this case, the reference block 302 may be a predetermined default block. In order to determine the submode of the image block 301, the upper 3 bits of the image information of the three primary colors of the two pixels 303, 304 of the first column in the image block 301 are compared with the upper 3 bits of the image information of the three primary colors of reference pixel A, and the upper 3 bits of the image information of the three primary colors of the two pixels 305, 306 of the second column are compared with the upper 3 bits of the image information of the three primary colors of reference pixel B.

Figure 4:
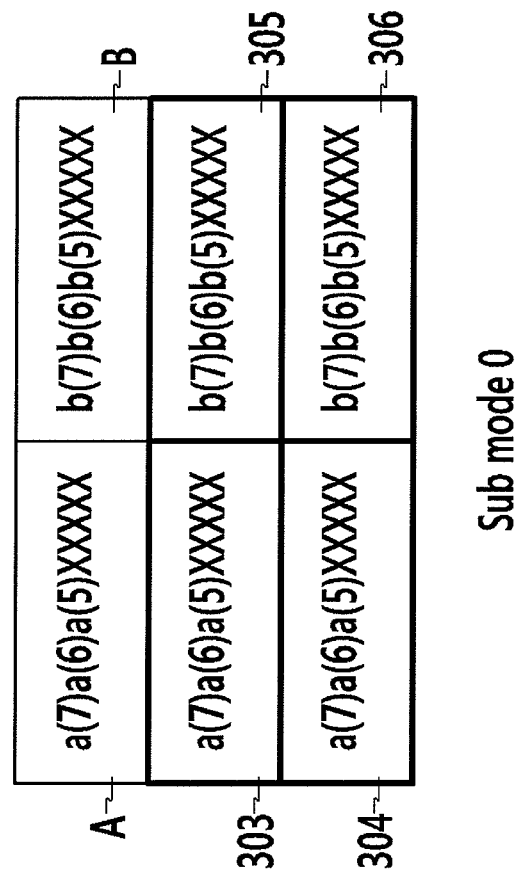
FIGS. 4 to 7 are diagrams showing examples of different submodes of the image block in FIG. 3, according to exemplary embodiments of the present invention.

FIG. 4 shows submode 0 of the image block 301. In submode 0, the upper 3 bits (e.g., a(7), a(6), a(5)) of the image information of the three primary colors of the two pixels 303, 304 in the first column in the image block 301 match the upper 3 bits (e.g., a(7), a(6), a(5)) of the image information of the three primary colors of reference pixel A. The upper 3 bits (e.g., b(7), b(6), b(5)) of the image information of the three primary colors of the two pixels 305, 306 in the second column in the image block 301 match the upper 3 bits (e.g., b(7), b(6), b(5)) of the image information of the three primary colors of reference pixel B.

Figure 5:
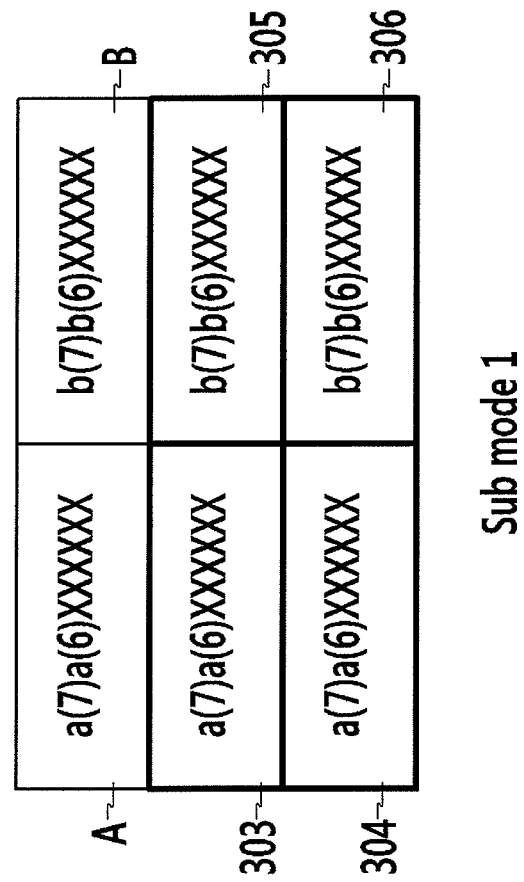

FIG. 5 shows submode 1 of the image block 301. In submode 1, the upper 2 bits (e.g., a(7), a(6)) of the image information of the three primary colors of the two pixels 303, 304 in the first column in the image block 301 match the upper 2 bits (e.g., a(7), a(6)) of the image information of the three primary colors of reference pixel A. The upper 2 bits (e.g., b(7), b(6)) of the image information of the three primary colors of the two pixels 305, 306 in the second column in the image block 301 match the upper 2 bits (e.g., b(7), b(6)) of the image information of the three primary colors of reference pixel B.

Figure 6:
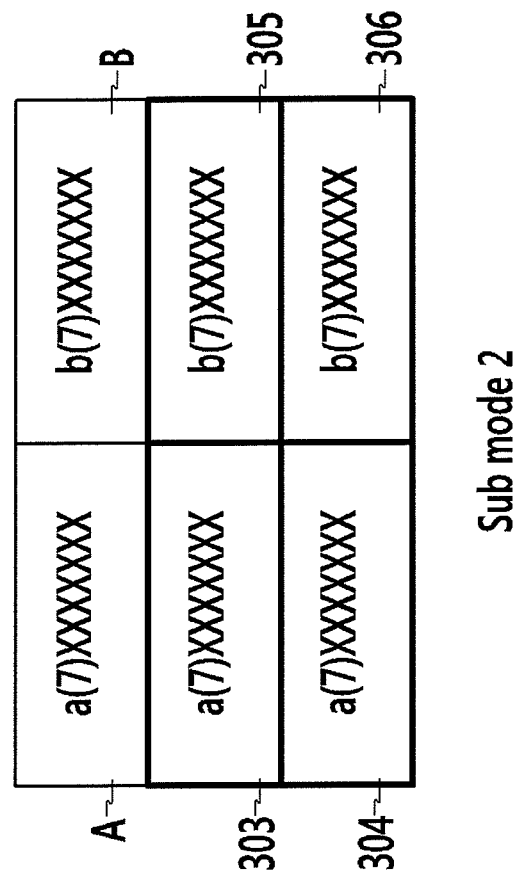

FIG. 6 shows submode 2 of the image block 301. In submode 2, the upper 1 bit (e.g., a(7)) of the image information of the three primary colors of the two pixels 303, 304 in the first column in the image block 301 matches the upper 1 bit (e.g., a(7)) of the image information of the three primary colors of reference pixel A. The upper 1 bit (e.g., b(7)) of the image information of the three primary colors of the two pixels 305, 306 in the second column in the image block 301 matches the upper 1 bit (e.g., b(7)) of the image information of the three primary colors of reference pixel B.

Figure 7:
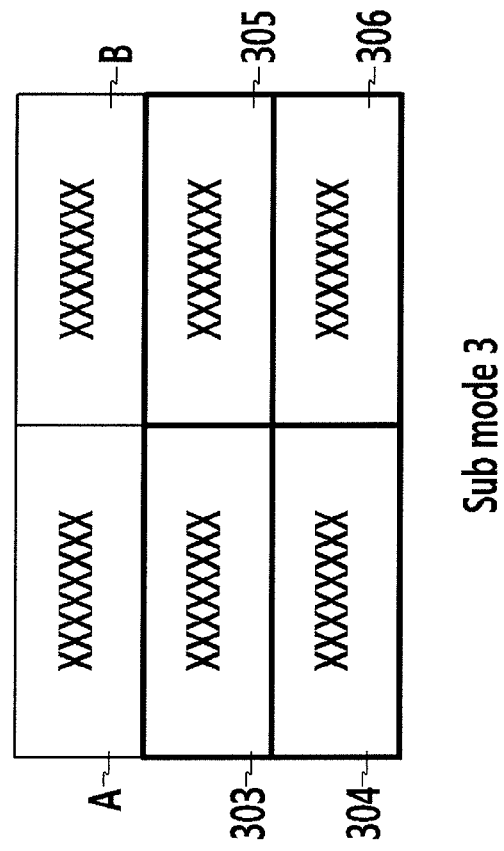

FIG. 7 shows submode 3 of the image block 301. In submode 3, the upper 3 bits of the image information of the three primary colors of the two pixels 303, 304 in the first column in the image block 301 do not match the upper 3 bits of the image information of the three primary colors of reference pixel A, and the upper 3 bits of the image information of the three primary colors of the two pixels 305, 306 in the second column in the image block 301 do not match the upper 3 bits of the image information of the three primary colors of reference pixel B.

FIGS. 4 to 7 each show image information of one of the three primary colors in a single image block 301. For example, the image information shown may correspond to the image information of the red image block, the green image block, or the blue image block within the single image block 301.

Referring to FIG. 2, once the submode is determined, the variable bit determination unit 120 determines the size of three primary color compression information fields corresponding to the red information (R), the green information (G), and the blue information (B) of the pixels in the image block 301. The size of each of the primary color compression information fields is based on the relational size of the color information of the three primary colors in a reference pixel in the image block 301. For example, the variable bit determination unit 120 determines the size of the compression information field of the red image block, the size of the compression information field of the green image block, and the size of the compression information field of the blue image block, based on the relational size of the red information (R), green information (G), and the blue information (B) in the reference pixel in the image block 301.

In an exemplary embodiment, the reference pixel is defined as a single pixel within the image block 301. Since the four pixels within the image block 301 are adjacent, correlation is increased. Therefore, the size of the three primary color compression information fields may be determined based on the relational size of the primary color information of the three primary colors of only the reference pixel, which is one of four pixels within the image block 301.

The coding unit 130 generates compressed image data by coding the image block 301 based on the submode determined by the submode determination unit 110, and the size of the three primary color compression information fields determined by the variable bit determination unit 120.

Figure 8:
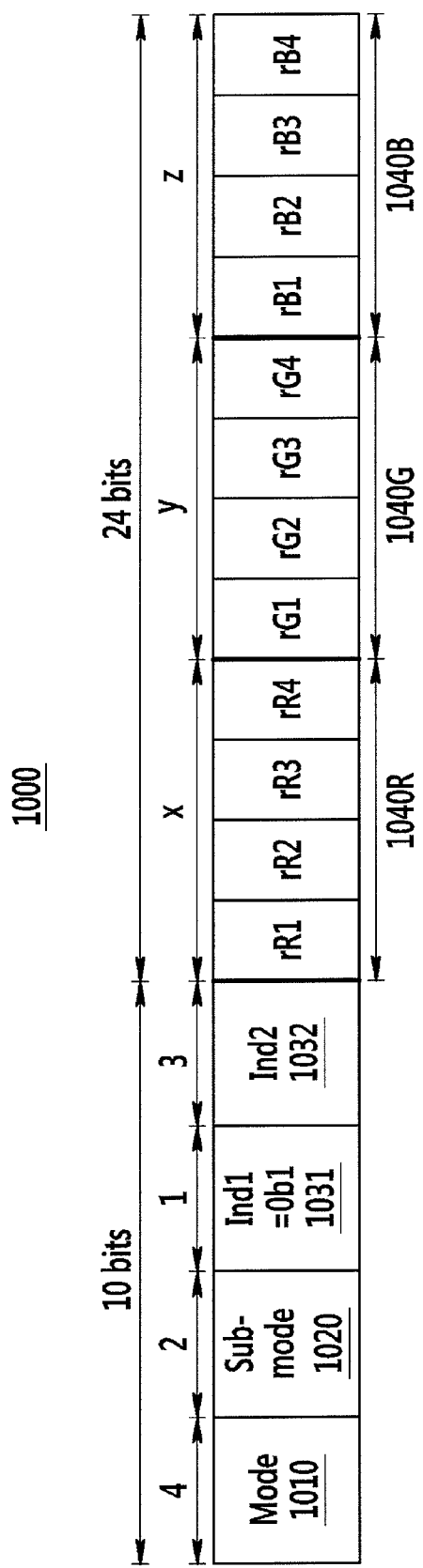
FIG. 8 is a diagram showing an example of compressed image data, according to an exemplary embodiment of the present invention.

FIG. 8 is a diagram showing compressed image data 1000 that has been compressed by the image compression device 60 using a PCM mode according to an exemplary embodiment of the present invention.

The compressed image data 1000 shown in FIG. 8 is generated in the entropy coding unit 63 when the compression mode is set as the PCM mode by the image compression device 60.

Referring to FIG. 8, the compressed image data 1000 includes a variable bit allocation indicator (e.g. a first indicator 1031 and a second indicator 1032), a mode indicator 1010, a submode indicator 1020, and three primary color compression information fields (e.g., a red compression information field 1040R, a green compression information field 1040G, and a blue compression information field 1040B).

The mode indicator 1010 indicates the compression mode of the compressed image data 1000. For example, in FIG. 8, the mode indicator 1010 indicates that the compression mode is the PCM mode. The size of the mode indicator 1010 may be, for example, 4 bits, however the size is not limited thereto.

The submode indicator 1020 indicates the submode of the image block 301, which indicates the matching degree between the upper bits of the image block 301 and the upper bits of the reference block 302. The size of the submode indicator 1020 may be, for example, 2 bits, however the size are not limited thereto.

The first indicator 1031 indicates whether the size of each of the three primary color compression information fields 1040R, 1040G, and 1040B is variable (e.g., variable bit allocation) or fixed (e.g., fixed bit allocation). For example, the size of the first indicator 1031 may be 1 bit, and when the first indicator 1031 is 0b1, the second indicator 1032 indicates the number of bits allocated to the three primary color compression information fields 1040R, 1040G, and 1040B. However, the size and value of the first indicator 1031 is not limited thereto.

The second indicator 1032 indicates the variable bit sizes x, y, and z of the red compression information field 1040R, the green compression information field 1040G, and the blue compression information field 1040B. The size of the second indicator 1032 may be, for example, 3 bits, however the size of the second indicator 1032 is not limited thereto. The second indicator indicates the variable bit sizes x, y, and z of the three primary color compression information fields 1040R, 1040G, and 1040B. When the size of the second indicator 1032 is 3 bits, there are 8 cases, each of which corresponds to a different relational size of the color information of the three primary colors in the reference pixel. When the relational size of the color information of the three primary colors in the reference pixel does not correspond to one of the 8 cases, the first indicator 1031 does not indicate variable bit allocation. In this case, the first indicator 1031 is 0b0, and the number of bits allocated to the three primary color compression information fields 1040R, 1040G, and 1040B is fixed. In this case, the variable bit allocation indicator does not include the second indicator 1032.

The three primary color compression information fields 1040R, 1040G, and 1040B include the information of the residual bits (e.g., bits other than the upper bits of the image block 301 that are matched to the upper bits of the reference block 302), and based on the submode indicated by the submode indicator 1020.

The red compression information field 1040R includes four red compression information subfields rR1, rR2, rR3, and rR4, the green compression information field 1040G includes four green compression information subfields rG1, rG2, rG3, and rG4, and the blue compression information field 1040B includes four blue compression information subfields rB1, rB2, rB3, and rB4. The four compression information subfields rR1 to rR4, rG1 to rG4, and rB1 to rB4 included in the three primary color compression information fields 1040R, 1040G, and 1040B correspond to the four pixels 303, 304, 305, 306 in the image block 301.

Referring to FIGS. 3 and 8, information subfields rR1, rG1, and rB1 correspond to pixel 303 of the image block 301, the compression information subfields rR2, rG2, and rB2 correspond to pixel 305 of the image block 301, the compression information subfields rR3, rG3, and rB3 correspond to pixel 304 of the image block 301, and the compression information subfields rR4, rG4, and rB4 correspond to pixel 306 of the image block 301.

The red compression information field 1040R includes the image information of the red residual bits (e.g., bits other than the upper bits that are matched to the upper bits of the reference red image block) in the red image block based on the submode indicated by the submode indicator 1020, the green compression information field 1040G includes the image information of the green residual bits (e.g., bits other than the upper bits that are matched to the upper bits of the reference green image block) in the green image block based on the submode indicated by the submode indicator 1020, and the blue compression information field 1040B includes the image information of the blue residual bits (e.g., bits other than the upper bits that are matched to the upper bits of the reference blue image block) in the blue image block based on the submode indicated by the submode indicator 1020. The sizes x, y, and z of the three primary color compression information fields 1040R, 1040G, and 1040B are determined by the first and second indicators 1031 and 1032. The total size of the three primary color compression information fields 1040R, 1040G, and 1040B may be, for example, 24 bits. However, the total size is not limited thereto.

Using the image compression techniques as described above, primary color information of the image block 301 may be reduced from 96 bits (e.g., 3*8*4) to 34 bits.

Table 1 shows examples of the sizes of the three primary color compression information fields 1040R, 1040G, and 1040B. The three primary color compression information fields 1040R, 1040G and 1040B are determined by the variable bit allocation indicator (e.g., the first indicator 1031 and the second indicator 1032). The variable bit allocation indicator (e.g., the first indicator 1031 and the second indicator 1032) are determined based on the relational size of the color information of the three primary colors in the reference pixel. In Table 1, Ind1 refers to the first indicator 1031, Ind2 refers to the second indicator 1032, rR refers to the red compression information field 1040R, rG refers to the green compression information field 1040G, and rB refers to the blue compression information field 1040B. rR1-rR4, rG1-rG4, and rB1-rB4 are subfields of the compression information fields 1040R, 1040G, and 1040B. In Table 1, the red information R, the green information G, and the blue information B of the reference pixel are each represented by 8 bits and indicate one gray scale value from among 256 gray scale values (e.g., 0 to 255).

TABLE 1

| Relational Size of RGB Values in Reference Pixel | Ind1 | Ind2 | rR | | | | rG | | | | rB | | | |
|---|---|---|---|---|---|---|---|---|---|---|---|---|---|---|
| | | | rR1 | rR2 | rR3 | rR4 | rG1 | rG2 | rG3 | rG4 | rB1 | rB2 | rB3 | rB4 |
| R > B > G, R-G > 100 | 0b1 | 0b000 | 4 | 4 | 4 | 4 | 0 | 0 | 0 | 0 | 2 | 2 | 2 | 2 |
| G > R > B, G-B > 100 | 0b1 | 0b001 | 2 | 2 | 2 | 2 | 4 | 4 | 4 | 4 | 0 | 0 | 0 | 0 |
| B > G > R, B-R > 100 | 0b1 | 0b010 | 0 | 0 | 0 | 0 | 2 | 2 | 2 | 2 | 4 | 4 | 4 | 4 |
| |B-R| <= 20, G < 50 | 0b1 | 0b011 | 3 | 3 | 3 | 3 | 0 | 0 | 0 | 0 | 3 | 3 | 3 | 3 |
| |R-G| <= 20, B < 50 | 0b1 | 0b100 | 3 | 3 | 3 | 3 | 3 | 3 | 3 | 3 | 0 | 0 | 0 | 0 |
| |G-B| <= 20, R < 50 | 0b1 | 0b101 | 0 | 0 | 0 | 0 | 3 | 3 | 3 | 3 | 3 | 3 | 3 | 3 |
| R > 150, G < 20, B < 20 | 0b1 | 0b110 | 5 | 5 | 5 | 5 | 1 | 1 | 1 | 1 | 0 | 0 | 0 | 0 |
| G > 150, R < 20, B < 20 | 0b1 | 0b111 | 1 | 1 | 1 | 1 | 5 | 5 | 5 | 5 | 0 | 0 | 0 | 0 |
| Remainder | 0b0 | — | 2 | 2 | 2 | 2 | 3 | 3 | 3 | 2 | 2 | 2 | 2 | 2 |

Table 1 shows examples of the relational size of the red information R, the green information G, and the blue information B in the reference pixel, corresponding values of the variable bit allocation indicator (e.g., the first indicator 1031 and the second indicator 1032), and the bit allocation of the three primary color compression information fields 1040R, 1040G, and 1040B for each case. The values shown in Table 1, including the constants used for the relational size of the red information R, the green information G, and the blue information B are exemplary, and the present invention is not limited thereto.

Examples of the various sizes of the three primary color compression information fields 1040R, 1040G, and 1040B determined by the variable bit allocation indicator (e.g., the first indicator 1031 and the second indicator 1032) of the compressed image data 1000 will be described with reference to Table 1 and FIGS. 9 to 20.

FIGS. 9 to 20 are diagrams showing the relationship between the variable bit indicator (e.g., the first indicator 1031 and the second indicator 1032) and the size of the three primary color compression information fields 1040R, 1040G, and 1040B, with reference to Table 1.

Referring to FIGS. 9 to 19, when the first indicator 1031 of the compressed image data 1000 is 0b1, the second indicator 1032 indicates the number of bits allocated to the three primary color compression information fields 1040R, 1040G, and 1040B.

Figure 9:
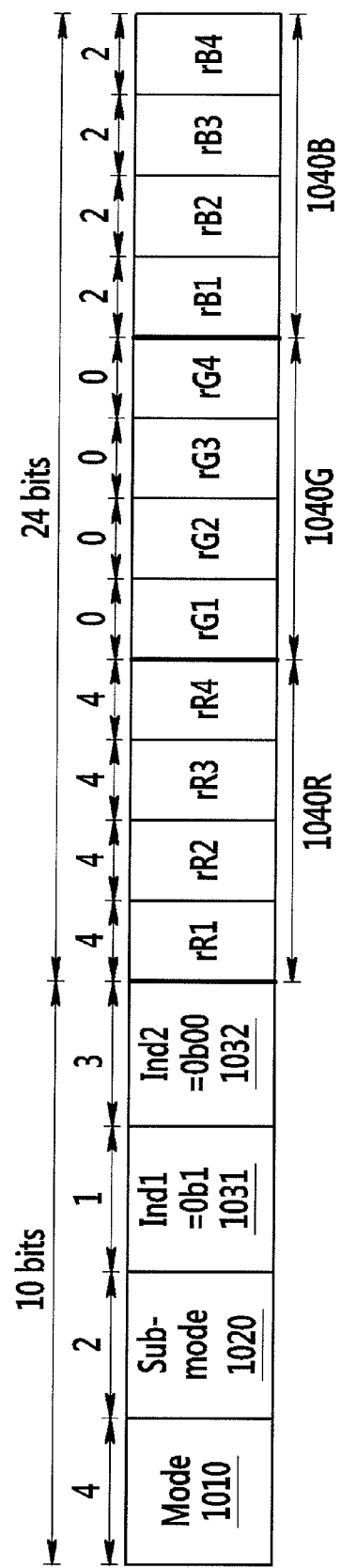

Referring to FIG. 9, the second indicator 1032 is 0b000, four red compression information subfields rR1, rR2, rR3, and rR4 each are 4 bits, four green compression information subfields rG1, rG2, rG3, and rG4 each are 0 bits, and four blue compression information subfields rB1, rB2, rB3, and rB4 each are 2 bits.

Referring to Table 1 with reference to FIG. 9, the size of the red information R of the reference pixel is larger than the size of the blue information B of the reference pixel, and the size of the blue information B of the reference pixel is larger than the size of the green information G of the reference pixel. The difference in the size between the largest red information R and the smallest green information G is larger than a predetermined value. For example, in Table 1, the predetermined value is 100.

Figure 11:
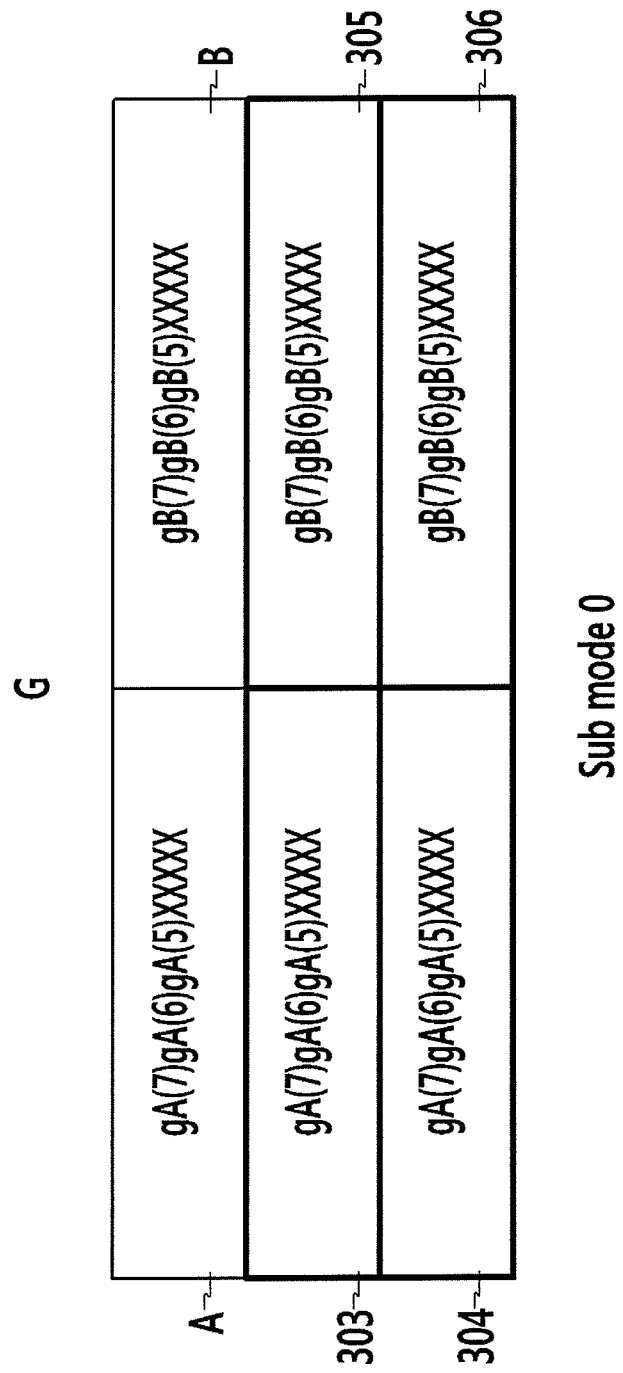
Figure 12:
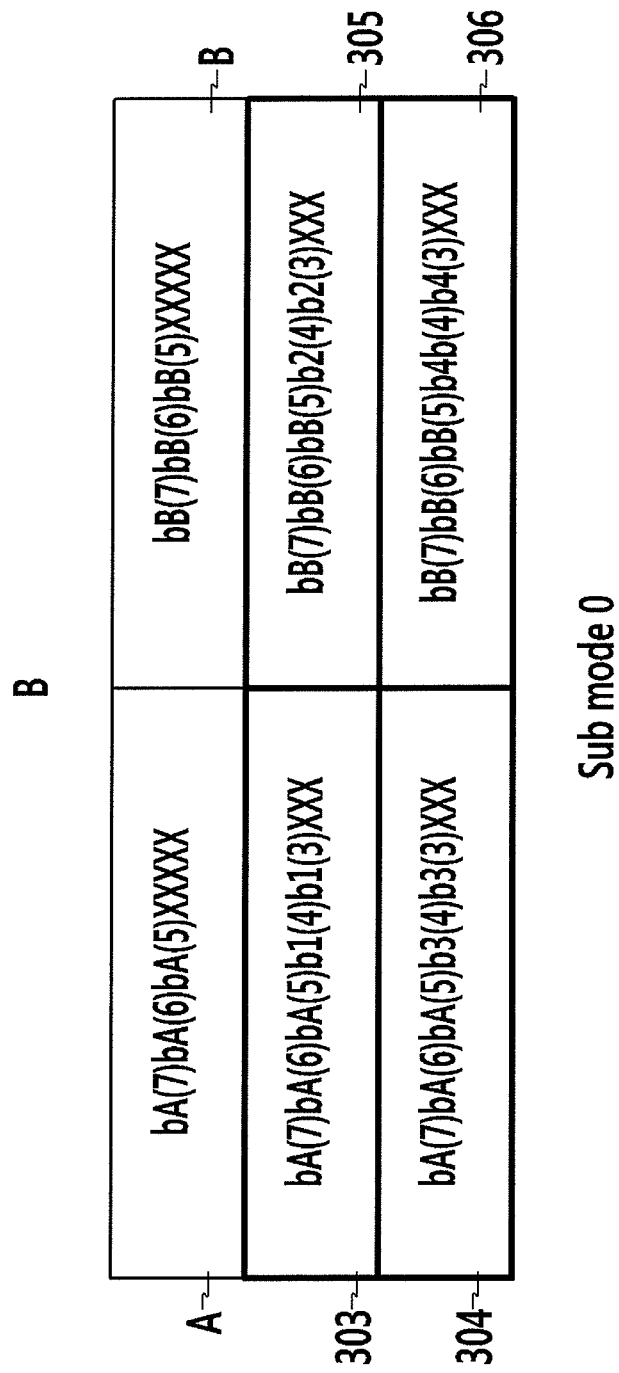

FIGS. 10 to 12 show the red image block R, the green image block G, and the blue image block B, all of which are recovered from the compressed image data 1000 when the submode indicator 1020 in the compressed image data 1000 of FIG. 9 indicates submode 0. Since the submode is submode 0, the upper 3 bits of the image block 301 matches the upper 3 bits of the reference block 302. Therefore, the upper 3 bits of the image block 301 are recovered from the submode indicator 1020. The remaining 5 bits of the image block 301 are recovered from the three primary color compression information fields 1040R, 1040G, and 1040B. When four compression information subfields rR1 to rR4, rG1 to rG4, and rB1 to rB4 included in the three primary color compression information fields 1040R, 1040G, and 1040B have respective values as shown in Equation 1, the image block 301 as shown in FIGS. 10 to 12 may be recovered.

$$rR1[4\ bits] = r1\ 4r1\ 3r1\ 2r1\ 1$$

$$rR2[4\ bits] = r2\ 4r2\ 3r2\ 2r2\ 1$$

$$rR3[4\ bits] = r3\ 4r3\ 3r3\ 2r3\ 1$$

$$rR4[4\ bits] = r4\ 4r4\ 3r4\ 2r4\ 1$$

$$rB1[2\ bits] = b1\ 4b1\ 3$$

$$rB2[2\ bits] = b2\ 4b2\ 3$$

$$rB3[2\ bits] = b3\ 4b3\ 3$$

$$rB4[2\ bits] = b4\ 4b4\ 3 \qquad \text{Equation 1}$$

Referring to Equation 1 and FIG. 10, the upper 7 bits of 8 bits for each pixel in the red image block are recovered, the upper 3 bits of 8 bits for each pixel in the green image block are recovered, and the upper 5 bits of 8 bits for each pixel in the blue image block are recovered. The image block 301 may be recovered from the compressed image data 1000 using a similar method for other submodes.

Figure 13:
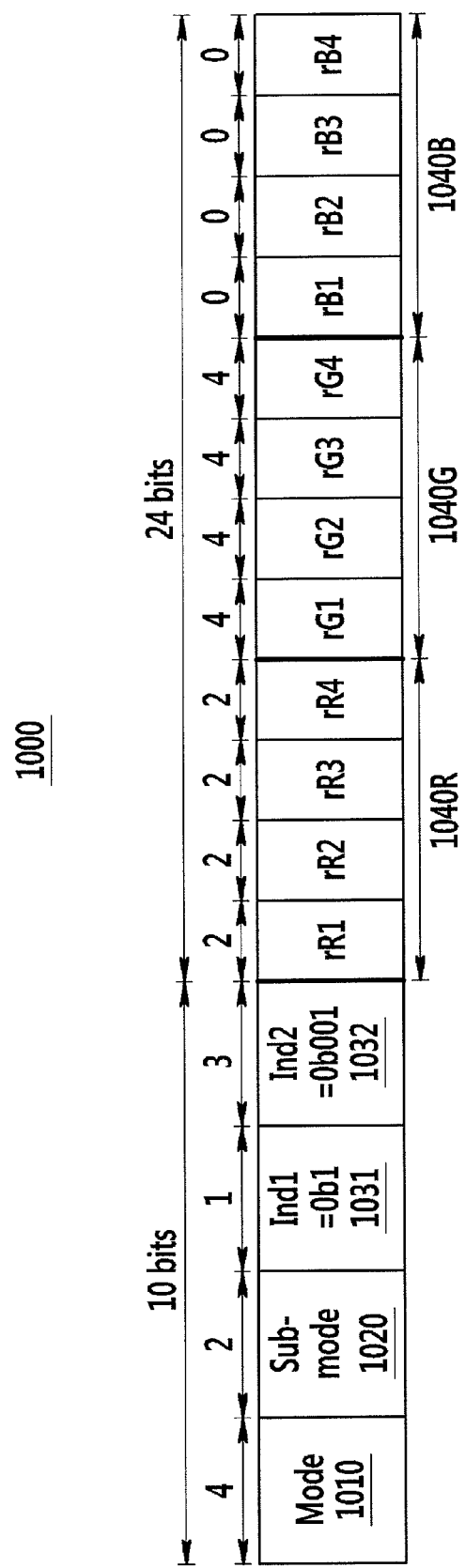

Referring to FIG. 13, the second indicator 1032 is 0b001, four red compression information subfields rR1, rR2, rR3, and rR4 each are 2 bits, four green compression information subfields rG1, rG2, rG3, and rG4 each are 4 bits, and four blue compression information subfields rB1, rB2, rB3, and rB4 each are 0 bits.

Referring to Table 1 with reference to FIG. 13, the size of the green information G of the reference pixel is larger than the size of the red information R of the reference pixel, and the size of the red information R of the reference pixel is larger than the size of the blue information B of the reference pixel. The difference in the size between the largest green information G and the smallest blue information B is larger than a predetermined value. For example, in Table 1, the predetermined value is 100.

Figure 14:
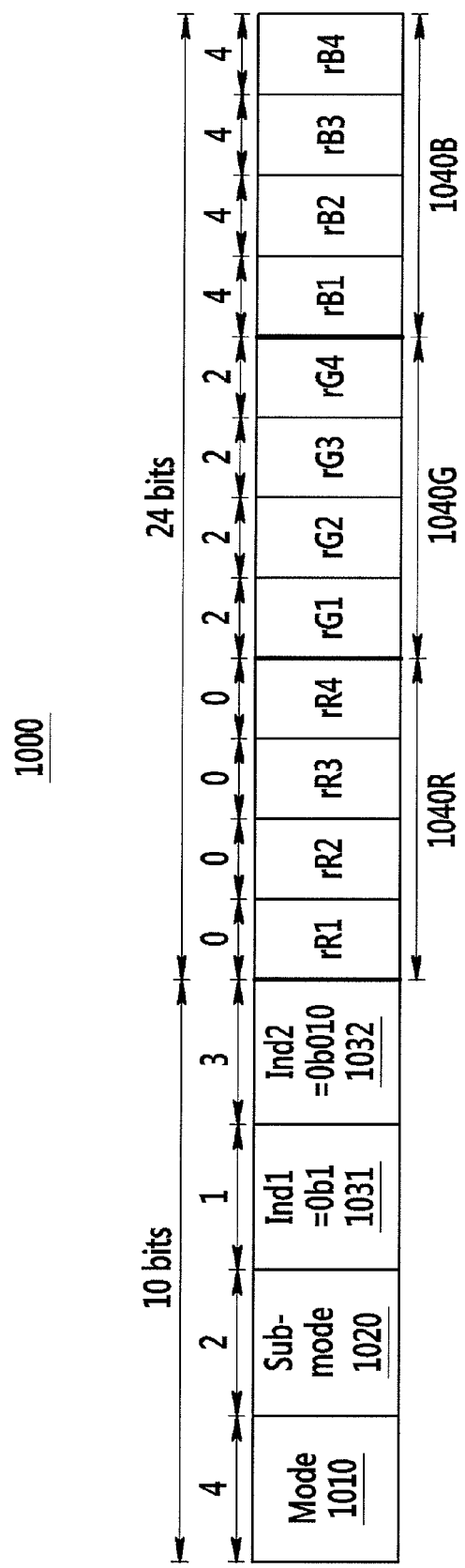

Referring to FIG. 14, the second indicator 1032 is 0b010, four red compression information subfields rR1, rR2, rR3, and rR4 each are 0 bits, four green compression information subfields rG1, rG2, rG3, and rG4 each are 2 bits, and four blue compression information subfields rB1, rB2, rB3, and rB4 each are 4 bits.

Referring to Table 1 with reference to FIG. 14, the size of the blue information B of the reference pixel is larger than the size of the green information G of the reference pixel, and the size of the green information G of the reference pixel is larger than the size of the red information R of the reference pixel. The difference in the size between the largest blue information B and the smallest red information R is larger than a predetermined value. For example, in Table 1, the predetermined value is 100.

Referring to Table 1 with reference to FIGS. 9, 13, and 14, when the size of the color information of the three primary colors is different, and the difference in the size between the color information having the largest size and the color information having the smallest size is larger than the predetermined value (e.g., 100), 4 bits are allocated to the compression information subfields corresponding to the color information having the largest size, 0 bits are allocated to the compression information subfields corresponding to the color information having the smallest size, and 2 bits are allocated to the compression information subfields corresponding to the color information having a size between the other two pieces of color information.

Figure 15:
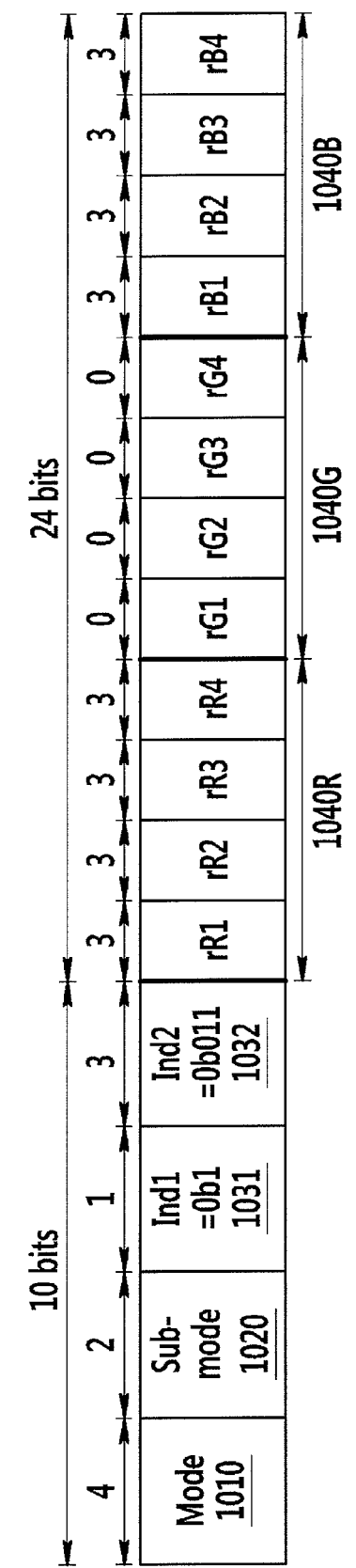

Referring to FIG. 15, the second indicator 1032 is 0b011, four red compression information subfields rR1, rR2, rR3, and rR4 each are 3 bits, four green compression information subfields rG1, rG2, rG3, and rG4 each are 0 bits, and four blue compression information subfields rB1, rB2, rB3, and rB4 each are 3 bits.

Referring to Table 1 with reference to FIG. 15, the difference in the size between the blue information B and the red information R of the reference pixel is less than or equal to a first predetermined value, and the size of the remaining green information G is less than a second predetermined value. For example, in Table 1, the first predetermined value is 20 and the second predetermined value is 50.

Figure 16:
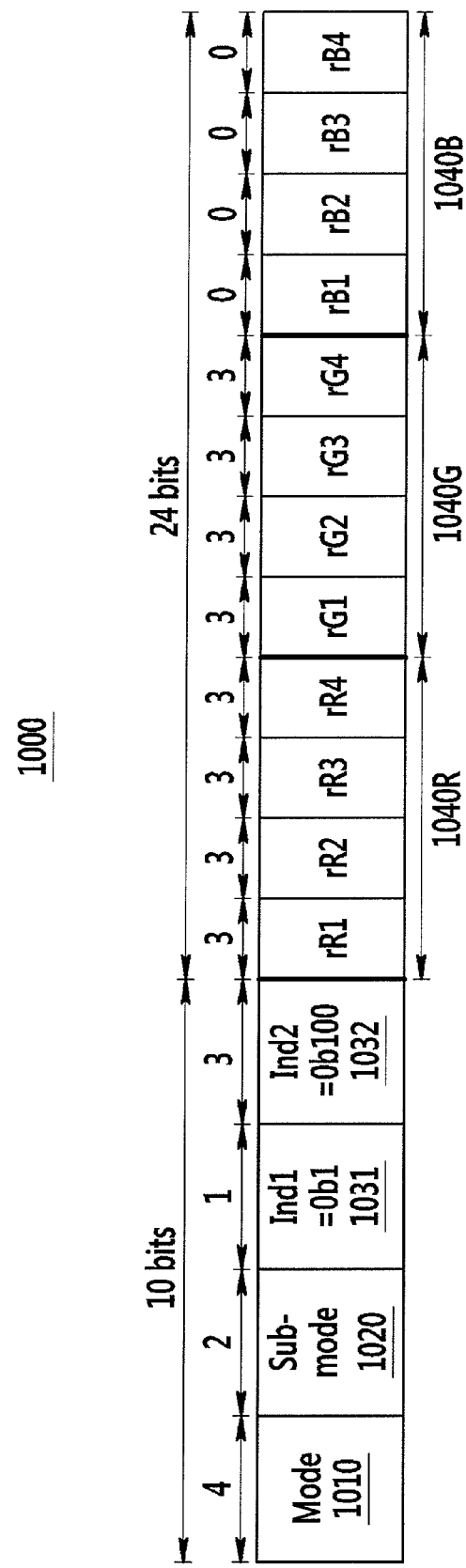

Referring to FIG. 16, the second indicator 1032 is 0b100, four red compression information subfields rR1, rR2, rR3, and rR4 each are 3 bits, four green compression information subfields rG1, rG2, rG3, and rG4 each are 3 bits, and four blue compression information subfields rB1, rB2, rB3, and rB4 each are 0 bits.

Referring to Table 1 with reference to FIG. 16, the difference in the size between the red information R and the green information G of the reference pixel is less than or equal to a first predetermined value, and the size of the remaining blue information B is less than a second predetermined value. For example, in Table 1, the first predetermined value is 20 and the second predetermined value is 50.

Figure 17:
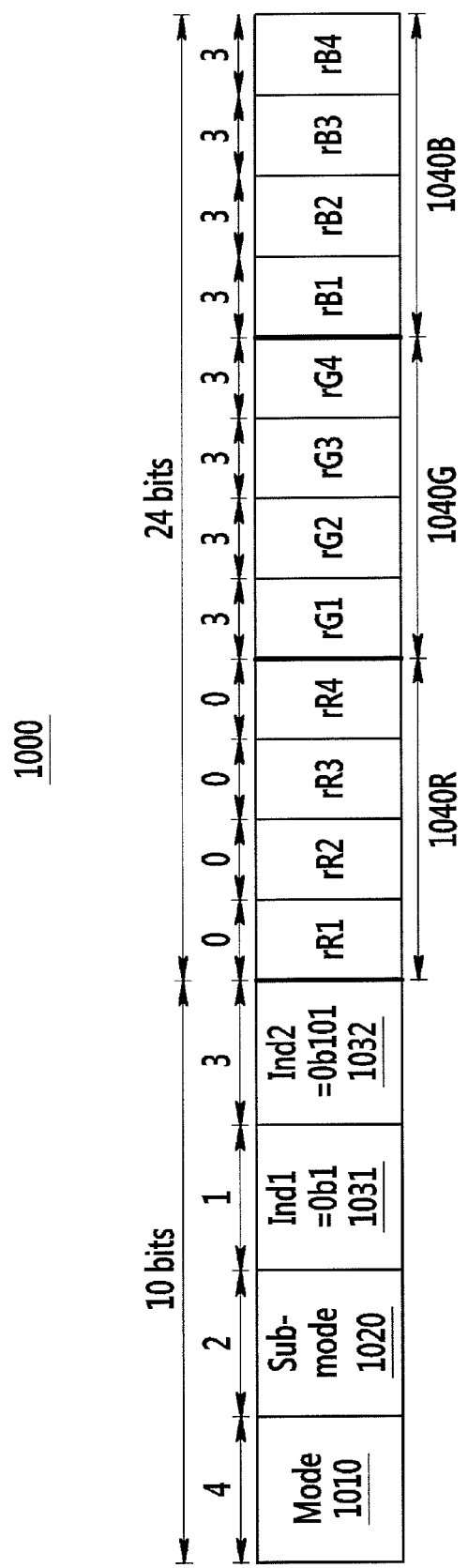

Referring to FIG. 17, the second indicator 1032 is 0b101, four red compression information subfields rR1, rR2, rR3, and rR4 each are 0 bits, four green compression information subfields rG1, rG2, rG3, and rG4 each are 3 bits, and four blue compression information subfields rB1, rB2, rB3, and rB4 each are 3 bits.

Referring to Table 1 with reference to FIG. 17, the difference in the size between the green information G and the blue information B of the reference pixel is less than or equal to a first predetermined value, and the size of the remaining red information R is less than a second predetermined value. For example, in Table 1, the first predetermined value is 20 and the second predetermined value is 50.

Referring to Table 1 with reference to FIGS. 15 to 17, when the difference in the size between the color information of two of the three primary colors is less than or equal to the first predetermined value (e.g., 20), and the size of the color information of the remaining primary color is less than the second predetermined value (e.g., 50), 3 bits are allocated to the compression information subfields of the color information of the first two primary colors, and 0 bits are allocated to the compression information subfields of the color information of the remaining primary color.

Figure 18:
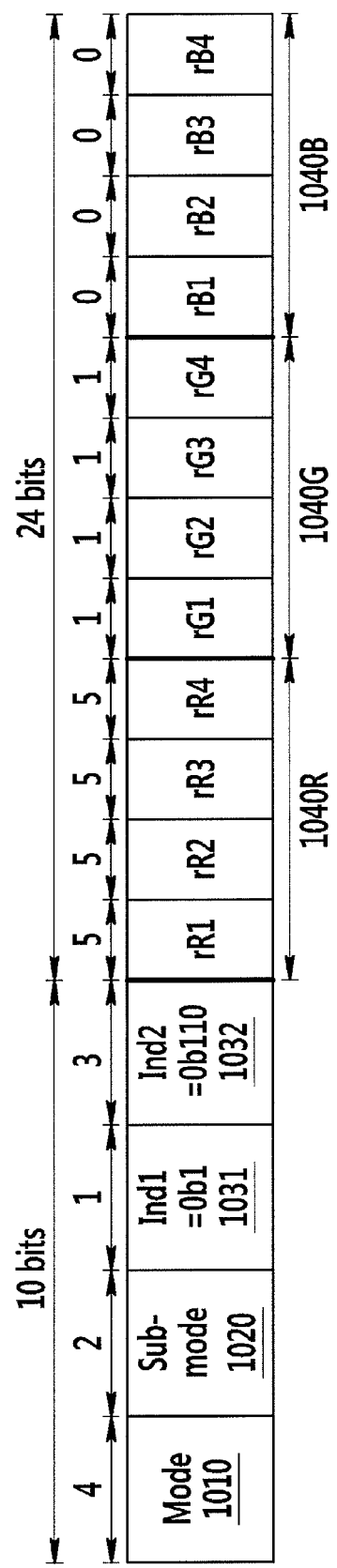

Referring to FIG. 18, the second indicator 1032 is 0b110, four red compression information subfields rR1, rR2, rR3, and rR4 each are 5 bits, four green compression information subfields rG1, rG2, rG3, and rG4 each are 1 bit, and four blue compression information subfields rB1, rB2, rB3, and rB4 each are 0 bits.

Referring to Table 1 with reference to FIG. 18, the size of the largest red information R is larger than a first predetermined value, and the size of each of the green information G and the blue information B is smaller than a second predetermined value. For example, in Table 1, the first predetermined value is 150 and the second predetermined value is 20.

Figure 19:
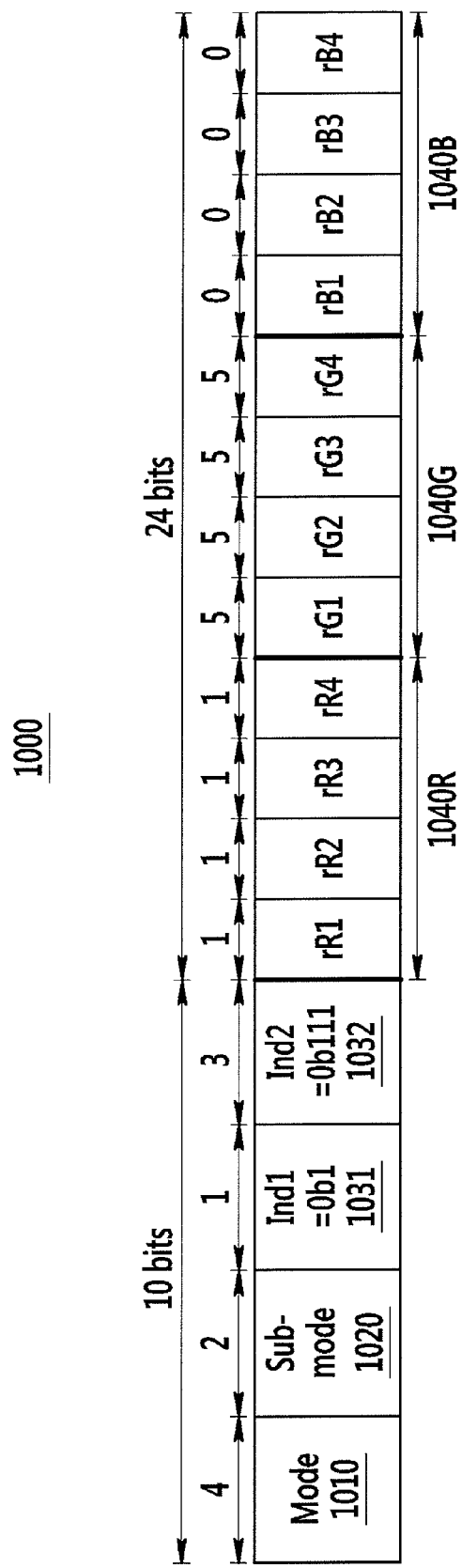

Referring to FIG. 19, the second indicator 1032 is 0b111, four red compression information subfields rR1, rR2, rR3, and rR4 each are 1 bit, four green compression information subfields rG1, rG2, rG3, and rG4 each are 5 bits, and four blue compression information subfields rB1, rB2, rB3, and rB4 each are 0 bits.

Referring to Table 1 with reference to FIG. 19, the size of the largest green information G is larger than a first predetermined value, and the size of each of the red information R and the blue information B is smaller than a second predetermined value. For example, in Table 1, the first predetermined value is 150 and the second predetermined value is 20.

Figure 20:
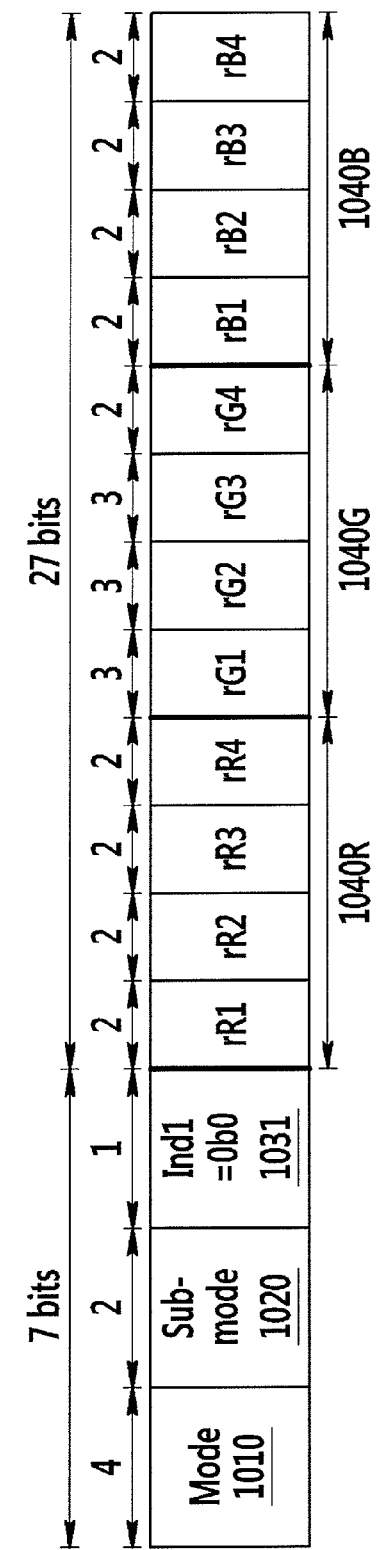

Referring to Table 1 with reference to FIG. 20, when the first indicator 1031 of the compressed image data 1000 is 0b0, the number of bits allocated to the three primary compression information fields 1040R, 1040G, and 1040B is fixed. In addition, the compressed image data 1000 does not include the second indicator 1032. For example, in Table 1, four red compression information subfields rR1, rR2, rR3, and rR4 each are 2 bits, four green compression information subfields rG1, rG2, rG3, and rG4 each are 3 bits, 3 bits, 3 bits, and 2 bits, respectively, and four blue compression information subfields rB1, rB2, rB3, and rB4 each are 2 bits.

Referring to Table 1, when the relational size of the color information of the three primary colors in the reference pixel does not correspond to one of the 8 cases indicated by the second indicator 1032, the first indicator 1031 is 0b0, and the size of the three primary color compression information fields 1040R, 1040G, and 1040B are allocated as being fixed.

Figure 21:
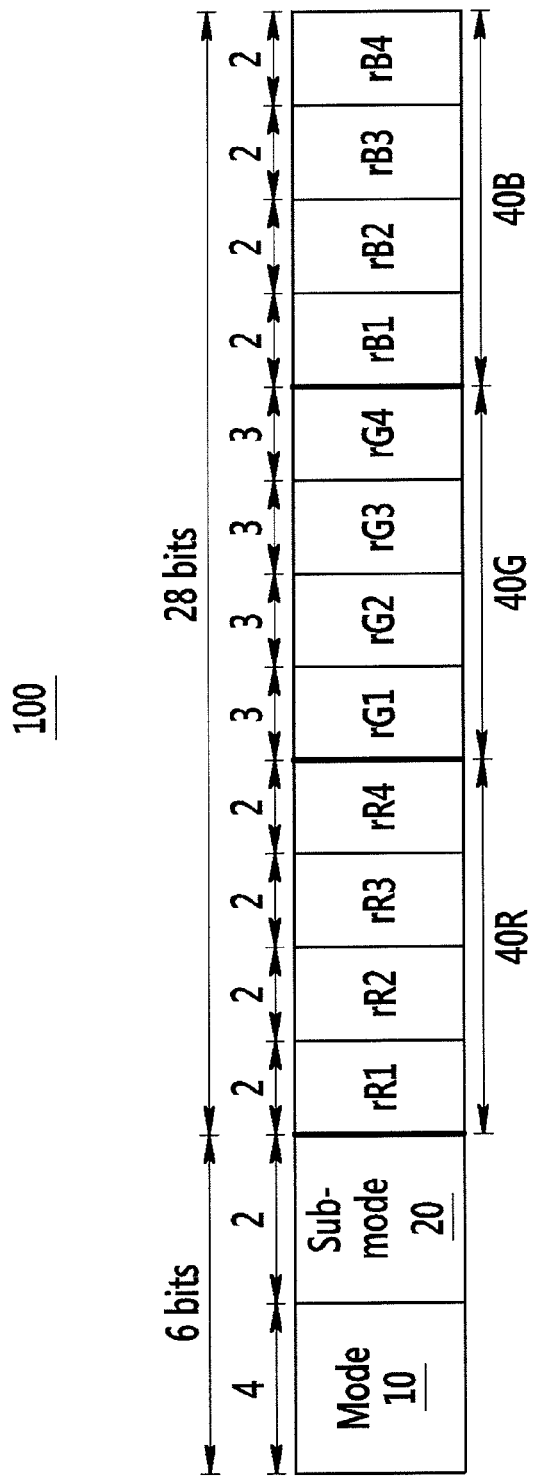
FIG. 21 is a diagram showing an example in which the size of the three primary color compression information fields of the compressed image data are allocated using fixed bit allocation, according to an exemplary embodiment of the present invention.

FIG. 21 is a diagram showing an example in which a PCM mode is utilized, and the size of the three primary color compression information fields 40R, 40G and 40B of the compressed image data 100 is allocated using fixed bit allocation for the entire image compression process.

Referring to FIG. 21, the compressed image data 100 includes a mode indicator 10, a submode indicator 20, a red compression information field 40R, a green compression information field 40G, and a blue compression information field 40B. The compressed image data in FIG. 21 does not include the variable bit allocation indicator.

Four red compression information subfields rR1, rR2, rR3, and rR4 each are 2 bits, four green compression information subfields rG1, rG2, rG3, and rG4 each are 3 bits, and four blue compression information subfields rB1, rB2, rB3, and rB4 each are 2 bits.

In the following example, assume that the size of the red information R is 255, the size of the green information G is 1, and the size of the blue information B is 3. When the difference in the relational size of the color information of the three primary colors is large, the number of errors may increase when the size of the three primary color compression information fields 40R, 40G and 40B are fixed. When the size of the green information G is 1, allocating 1 bit may be sufficient to represent the green information G. However, since differentiating gray scale 0 or gray scale 1 may be difficult, the number of errors may be reduced when the bits normally allocated to the green compression information subfields rG1, rG2, rG3, and rG4 are instead allocated to the red compression information subfields rR1, rR2, rR3, and rR4. Therefore, to reduce the number of errors while maintaining the compression rate, the size of the three primary color compression information fields 40R, 40G and 40B of the compressed image data 100 may be allocated using variable bit allocation based on the relational size of the color information of the three primary colors in the reference pixel.

Figure 22:
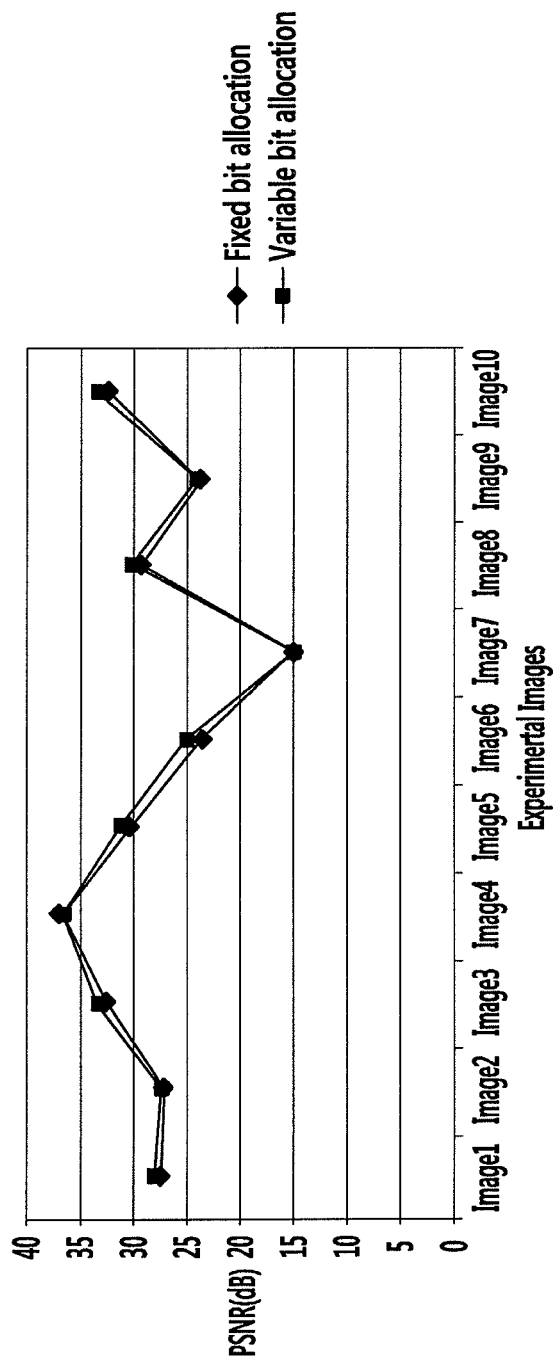
FIG. 22 is an example showing the peak signal to noise ratio (PSNR) when the size of the three primary color compression information fields of compressed image data is allocated using fixed bit allocation, and the PSNR when the size of the three primary color compression information fields of compressed image data is allocated using variable bit allocation, according to an exemplary embodiment of the present invention.

FIG. 22 shows an example of the peak signal to noise ratio (PSNR) when the size of each of the three primary color compression information fields of compressed image data is allocated to an experimental image using fixed bit allocation, as shown in FIG. 21, and the PSNR when the size of each of the three primary color compression information fields of compressed image data is allocated to an experimental image using variable bit allocation, according to exemplary embodiments of the present invention.

Referring to the example shown in FIG. 22, the x-axis corresponds to 10 experimental images, and the y-axis indicates the corresponding PSNR (dB) value.

Table 2 indicates the PSNR when variable bit allocation is utilized for 10 experimental images, and the PSNR when fixed bit allocation is utilized for the 10 experimental images, as shown in FIG. 22.

TABLE 2

|  | 1 | 2 | 3 | 4 | 5 | 6 | 7 | 8 | 9 | 10 |
|---|---|---|---|---|---|---|---|---|---|---|
| Fixed Bit Allocation | 27.3099 | 27.1603 | 32.5226 | 36.9688 | 30.3769 | 23.5437 | 14.9052 | 29.6226 | 23.9388 | 32.3248 |
| Variable Bit Allocation | 27.8522 | 27.2568 | 32.9981 | 36.4486 | 31.0054 | 24.9154 | 14.9846 | 29.9554 | 24.1159 | 33.1682 |

Referring to the example shown in Table 2 and FIG. 22, the PSNR may be improved when variable bit allocation is used. For example, the average improvement of the PSNR for the 10 experimental images may be about 0.4 dB.

As described above, according to exemplary embodiments of the present invention, when the size of the three primary color compression information fields of the compressed image data is allocated using variable bit allocation based on the relational size of the color information of the three primary colors in the reference pixel, the number of errors may be reduced while maintaining the compression rate.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A mode coding unit for an image compression device, comprising:
 a submode determination unit configured to determine a submode of an image block, wherein the submode indicates a matching degree between an upper bit of the image block and an upper bit of a reference block;
 a variable bit determination unit configured to determine a size of primary color compression information fields corresponding to primary colors in a reference pixel in the image block, based on a relational size of color information of the primary colors; and
 a coding unit configured to generate compressed image data by coding the image block based on the submode and the size of the primary color compression information fields.

2. The mode coding unit of claim 1, wherein:
 the compressed image data includes a submode indicator that indicates the submode, a variable bit allocation indicator that indicates the size of the primary color compression information fields, and the primary color compression information fields.

3. The mode coding unit of claim 2, wherein:
 the variable bit allocation indicator includes a first indicator that indicates whether the size of the primary color compression information fields is variable or fixed.

4. The mode coding unit of claim 3, wherein:
 the variable bit allocation indicator includes a second indicator that indicates the size of the primary color compression information fields.

5. The mode coding unit of claim 4, wherein:
 the second indicator indicates one of a plurality of cases, and each of the plurality of cases corresponds to a different relational size of the color information of the primary colors in the reference pixel.

6. The mode coding unit of claim 5, wherein:
 the first indicator indicates that the size of the primary color compression information fields is fixed upon determining that the relational size of the color information of the primary colors in the reference pixel does not correspond to one of the plurality of cases.

7. The mode coding unit of claim 2, wherein:
 the compressed image data further includes a mode indicator that indicates a compression mode of the compressed image data.

8. The mode coding unit of claim 1, wherein:
 the primary color compression information fields include residual bit information corresponding to at least one bit other than the upper bit of the image block that is compared to the upper bit of the reference block.

9. The mode coding unit of claim 1, wherein:
 the image block includes a red image block, a green image block, and a blue image block.

10. A method of compressing image data, comprising:
 determining a submode of an image block, wherein the submode indicates a matching degree between an upper bit of the image block and an upper bit of a reference block;
 determining a size of primary color compression information fields corresponding to primary colors in a reference pixel in the image block, based on a relational size of color information of the primary colors; and
 generating compressed image data by coding the image block based on the submode and the size of the primary color compression information fields.

11. The method of claim 10, wherein:
 the compressed image data includes a submode indicator that indicates the submode, a variable bit allocation indicator that indicates the size of the primary color compression information fields, and the primary color compression information fields.

12. The method of claim 11, wherein:
 the primary color compression information fields include residual bit information corresponding to at least one bit other than the upper bit of the image block that is compared to the upper bit of the reference block.

13. The method of claim 10, further comprising:
 determining whether bits in the primary color compression information fields are to be allocated using fixed bit allocation or variable bit allocation based on a first indicator in the compressed image data.

14. The method of claim 13, further comprising:
 determining a size of a red compression information field, a green compression information field, and a blue compression information field based on a second indicator,
 wherein the primary color compression information fields include the red compression information field, the green compression information field, and the blue compression information field.

15. The method of claim 10, further comprising:
 comparing a size of the color information of each of the primary colors with each other to determine the relational size of the color information of the primary colors.

16. The method of claim 10, further comprising:
 determining a number of errors for each of a plurality of compression modes;
 generating recovery information for each of the plurality of compression modes;
 generating error information by comparing the recovery information of each of the plurality of compression modes with image information; and
 selecting one of the plurality of compression modes based on the error information.

17. An image compression device, comprising:
 a mode coding unit configured to generate compressed image data corresponding to each of a plurality of compression modes,
 wherein the compressed image data is generated by coding an image block based on a comparison of an upper bit of the image block with an upper bit of a reference block, and a size of primary color compression information fields corresponding to primary colors in a reference pixel of the image block;
 a mode determination unit configured to select one of the plurality of compression modes based on a number of errors in the compressed image data corresponding to each of the plurality of compression modes; and
 an entropy coding unit configured to output final compressed image data based on the compression mode selected by the mode determination unit.

18. The image compression device of claim 17, wherein:
 the mode coding unit comprises a plurality of coding units, and each coding unit is configured to compress image data using one of the plurality of compression modes.

19. The image compression device of claim 18, wherein:
 one of the plurality of coding units is configured to compress the image data using pulse code modulation (PCM).

20. The image compression device of claim 17, wherein:
the number of errors is based on a comparison of recovery information and image information corresponding to each compression mode.

21. The image compression device of claim 17, wherein:
the size of the primary color compression information fields is determined based on a relational size of color information of the primary colors.

* * * * *